United States Patent [19]

Martinengo et al.

[11] 4,354,990
[45] Oct. 19, 1982

[54] PROCESS FOR SINTERING SILICON NITRIDE COMPACTS

[75] Inventors: Pier C. Martinengo; Angelo Giachello; Giuseppe Tommasini, all of Turin, Italy; Paul Popper, Newcastle, England

[73] Assignee: Fiat Societa per Azioni, Turin, Italy

[21] Appl. No.: 180,725

[22] Filed: Aug. 25, 1980

Related U.S. Application Data

[63] Continuation of Ser. No. 970,592, Dec. 18, 1978, abandoned.

[30] Foreign Application Priority Data

Dec. 23, 1977 [IT]  Italy ............................. 69899 A/77
Dec. 23, 1977 [IT]  Italy ............................. 69900 A/77
Dec. 5, 1978 [IT]  Italy ............................. 69777 A/78

[51] Int. Cl.$^3$ ........................................... C04B 35/58
[52] U.S. Cl. ..................................... 264/65; 501/154
[58] Field of Search ............................ 264/65, 66, 325

[56] References Cited

FOREIGN PATENT DOCUMENTS 1448732  9/1976  United Kingdom ................ 264/332

Primary Examiner—John A. Parrish
Attorney, Agent, or Firm—Sughrue, Mion, Zinn, Macpeak & Seas

[57] ABSTRACT

Sintered silicon nitride articles are prepared by sintering a silicon nitride compact of a density of at least 1.3 g/cm$^3$ in nitrogen gas atmosphere at substantially atmospheric pressure, while the compact is embedded in a protective powder comprising silicon nitride, boron nitride, or a mixture of silicon nitride and boron nitride, and one or more sinterization additives for silicon nitride, said additives being present in the protective powder in an amount of from 3 to 20% by weight.

32 Claims, No Drawings

PROCESS FOR SINTERING SILICON NITRIDE COMPACTS

This is a continuation of application Ser. No. 970,592, filed Dec. 18, 1978, now abandoned.

The present invention relates to a process for sintering silicon nitride compacts.

Silicon nitride is currently considered, among ceramic materials, to be that with the most interesting prospects for use in the manufacture of structural components for heat engines, i.e., gas turbines. Hot-pressing of silicon nitride yields material of high mechanical properties, but articles of complex shapes are not readily obtained by this method which has, moreover, limited production capability. Therefore, various studies on the sintering of silicon nitride have been initiated to produce high strength, high density silicon nitride in complex shapes on a cost effective basis.

It is known that silicon nitride is a compound which is very difficult to sinter both because of the covalent nature of its bonding and because of its thermal instability at temperatures higher than 1500° C. In order to activate the densification process it is necessary to treat the compound at temperatures higher than 1500° C., with consequent shifting of the equilibrium $$Si_3N_4 \rightleftarrows 3Si + 2N_2 \quad (1)$$

towards the formation of the elements.

At 1700° C. in the presence of nitrogen, at atmospheric pressure, the loss in weight of the $Si_3N_4$ powder may be of the order of 20% per hour.

Several studies have been carried out on the possibility of limiting this decomposition; positive results have, until now, been obtained solely by operating in a nitrogen atmosphere and at a pressure (100 atm) such as to allow the equilibrium of the reaction (1) to be displaced towards the left.

Densification can also be promoted by increasing the "green" density of the compacts to be sintered, by using a powder of finer particle size, or by using sintering additives. Since silicon nitride is not readily sinterable in the pure state, additives have been used in the art to promote sintering, usually by liquid phase formation. Reference is made in this connection to G. E. Gazza, Sintered Silicon Nitride, Ceramics for High Performance Applications—II, Proceeding of the Fifth Army Materials Technology Conference, Newport Mar. 21-25, 1977, Editors J. J. Burke, E. N. Lenoe and R. N. Katz, published in cooperation with the Metals and Ceramics Information Center, Columbus, Ohio. Conventional sintering additives are usually chosen from oxides such as MgO, $Y_2O_3$, $CeO_2$, BeO and $Z_2O_2$, rare earth based additions, spinel and non-oxide additions, such as $Mg_3N_2$, AlN and $Mg_2Si$, as shown in the above publication.

As well as inhibiting the decomposition of the $Si_3N_4$ during the sintering treatment, it is thus necessary to control the possible removal or redistribution within the $Si_3N_4$ of the sintering additives. These latter generally form liquid phases at the treatment temperature which, on the one hand, may be partially removed due to their vapour pressure, and, on the other hand, may react with the free silicon produced by the decomposition of the $Si_3N_4$, being redistributed in a non-homogeneous manner in the material.

The object of the present invention is to provide a sintering process which limits the thermal decomposition of the $Si_3N_4$ at the sintering temperature without the need to use pressure greater than atmospheric and which provides conditions which allows sintered products to be obtained with high density and structural homogeneity.

The invention provides a process for preparing a sintered silicon nitride article, which comprises the step of sintering a silicon nitride compact of a density of at least 1.3 g/cm³ in nitrogen gas atmosphere at substantially atmospheric pressure, while the compact is embedded in a protective powder comprising $Si_3N_4$, BN or a mixture of silicon nitride and boron nitride, and one or more sinterization additives for silicon nitride, said additives being present in the protective powder in an amount of from 3 to 20% by weight.

Thus, a main feature of the process of the invention consists of embedding the $Si_3N_4$ compact to be sintered in a protective powder of a specified type and of a suitable composition. Without wishing to be bound to any theory on the reaction mechanisms, it is probable that the powder partially decomposes and vaporizes during the densification treatment, creating an atmosphere of $N_2$ around the compact and forming vapour or liquid phases which diffuse into the compact or prevent similar phases present in the compact from diffusing towards the surface by filling up the pores or compensating for concentration gradients resulting from evaporation or from chemical reactions.

It should be noted that the use of protective powders consisting of silicon nitride and/or boron nitride makes possible acceptable control of the thermal dissociation reaction of the $Si_3N_4$ during treatment in the temperature range of 1600°-2000° C.

The materials thus obtained, however, have little uniformity of appearance and have structural and/or chemical discontinuities between the core and the external surface.

The innovative factor lies in the use, as the protective powder, of $Si_3N_4$ or a mixture of $Si_3N_4$ and BN containing one or more of the conventional sintering additives used for activating the densification process. By this means, the thermal decomposition of the $Si_3N_4$ is limited and in many cases rendered practically negligible and sintered materials which are structurally and chemically homogeneous are obtained.

Any conventional sintering additive may be used for the purpose. Preferred additives are MgO, $Y_2O_3$, CeO, $ZrO_2$, BeO, $Mg_3N_2$ and AlN. Other examples of additives are $Mg_2Si$, spinels, such as $MgAl_2O_4$, and rare earth additions, such as $La_2O_3$. Although not being classified among the conventional sintering additives, Fe can also be used with advantage as an additive in the process of the invention, especially in mixture with conventional additives such as MgO, $Y_2O_3$ and $CeO_2$.

The protective powder may also contain release agents chosen from refractory materials. Since BN acts as a release agent, the powder preferably consists essentially of $Si_3N_4$, BN and additives, although a powder consisting essentially of $Si_3N_4$ and additives may also be used with advantage.

The amount of additives in the protective powder is normally from 3 to 20% by weight, preferred values being generally of from 5 to 15% by weight and best results being generally obtained with values of the order of 5–10%, the most suitable values depending also on the nature of the silicon nitride to be sintered. Moreover, the best results are generally obtained by using MgO as an additive, either alone or in mixture with other additives such as $Y_2O_3$.

The silicon nitride compact may be embedded in the powder by placing the compact on a layer of powder, which has been introduced into the container (generally a graphite, $Si_3N_4$ or SiC crucible), and subsequently covering it completely with the said powder. Preferably, the powder should have a homogeneous density and a uniform composition around the compact.

The container, which is closed by a lid, is then generally subjected to flushing with nitrogen to remove the gases trapped in the protective powder and in the interface between the latter and the compact, before the sintering treatment. The degassing treatment may be carried out at atmospheric pressure. It is also possible to carry out the degassing by applying a subatmospheric pressure (for example $10^{-3}$ Torr) and then flushing with nitrogen while gradually bringing the pressure to atmospheric. The degassing may conveniently be carried out while gradually bringing the compact to the sintering temperature. If desired, a series of vacuum and flushing treatments may be carried out.

The sintering treatment is carried out in a nitrogen atmosphere, the pressure being substantially atmospheric. The other sintering conditions do not substantially depart from those conventionally used in the art. The sintering temperature generally does not exceed 2000° C. and preferably is from 1600° to 1900° C., best results being generally obtained with temperatures of the order of 1800° C. The sintering time is generally of the order of 0.5–6 hours.

The material to be sintered may be produced by forming a silicon nitride powder into compacts of the desired shape by any conventional method, such as pressing and isopressing, vibration compaction (ramming), extrusion and injection molding, cold isostatic pressing being generally preferred. In each case, the operating conditions should be such as to obtain a compact with a density of at least 1.3 g/cm$^3$, and preferably of the order of 1.9–2 g/cm$^3$, the most suitable values depending also on the size of the particles. Thus, in the case of particles having a size of at least 1$\mu$, densities lower than 1.5 g/cm$^3$ do not yield completely satisfactory results. On the other hand, "green" densities exceeding about 2.1 g/cm$^3$ are difficult to achieve. The silicon nitride particles generally have a size of from 0.1 to 44$\mu$, best results being generally obtained with sizes not exceeding about 5$\mu$.

The silicon nitride powder to be compacted may contain one or more sintering additives chosen from Fe and those conventionally used in the art, such as MgO, $Y_2O_3$, $CeO_2$, $ZrO_2$, BeO, $Mg_3N_2$, $Mg_2Si$, AlN, $MgAl_2O_4$, $Be_3N_2$ and $La_2O_3$. As in the case of the "external" additives present in the protective powder, it is possible to use mixtures of Fe with conventional additives. Best results are generally obtained by using a mixture of MgO and $Y_2O_3$.

These "internal" additives are generally used in amounts not exceeding 20 wt.% with respect to the compact, and preferably from 1 to 12 wt.%, best results being generally obtained with amounts of from 5 to 10% by weight, the most suitable amounts also depending on the amount of external additive present in the protective powder. Thus, when the external additive is used in low amounts, it is generally preferable to use somewhat higher amounts of internal additives. Likewise, when the internal additive is used in low amounts, or is absent from the compact, it is generally preferable to use somewhat higher amounts of external additives. The internal additives may be identical with, or different from the external additives. However, it is generally preferable to use identical additives or a mixture comprising at least one of the additives used in the protective powder.

The material to be sintered may also consist of reaction bonded silicon nitride. As is known in the art, reaction bonded silicon nitride is generally prepared by forming silicon powder into a compact of the desired shape and density (generally at least 1.3 g/cm$^3$ and preferably at least 1.5 g/cm$^3$). The compact is then nitrided, generally at 1350°–1450° C., with consequent increase in density without substantial dimensional change, thus obtaining a reaction bonded material having generally a density of at least 2.2 g/cm$^3$ and typically of the order of 2.5–2.6 g/cm$^3$. Densities exceeding 2.7 g/cm$^3$ are difficult to achieve, whatever may be the starting density of the silicon compact and the nitridation conditions. This reaction bonded material can with advantage be submitted to the sintering process of the invention, thus obtaining a material of improved strength and density, the final density being close to the theoretical value (3.18 g/cm$^3$).

The compacting of the silicon powder and the nitriding may be carried out by any of the known methods. Reference is made in this connection to R. W. Ohnsorg, Reaction Bonded $Si_3N_4$, Preparation and Properties, the American Ceramic Society Spring Meeting, Washington, D.C., May 9, 1972, and F. L. Riley, Nitridation and Reaction Bonding, Nitrogen Ceramics, Noordhoff International Publishing, Leyden, The Netherlands, 1977. In particular, the silicon powder generally has a particle size of from 0.1 to 44$\mu$, best results being generally obtained with low sizes.

The silicon powder may contain small mounts of conventional nitriding catalysts. According to one embodiment of the present invention, one or more sintering additives as hereinbefore defined (additives present in the protective powder and possibly in the silicon nitride to be compacted) are also added to the silicon powder to be converted into reaction bonded material. The amount of additives is generally such as to ensure in the reaction bonded material an additive content not exceeding 20 wt.%, and preferably from 1 to 12 wt.%, best results being generally obtained with amounts of from 5 to 10 wt.%. As in the case of the compacts obtained from silicon nitride powder, the most suitable values depend on the amount of external additive present in the protective powder. As to the choice of these internal additives, the considerations are wholly similar to those already expressed in the case of compact obtained from silicon nitride powder, and excellent results have also been obtained when using a mixture of MgO and $Y_2O_3$ as internal additives.

In conclusion, the process of the invention affords the following advantages:

possibility of sintering $Si_3N_4$ compacts without substantial thermal decomposition during the treatment;

use of sintering furnaces operating at atmospheric pressure without the need to use autoclaves;

obtaining of homogeneous sintered articles both from the structural and the chemical point of view;

possibility of application of the method to components of any shape and size.

The process of the invention will now be illustrated by the following non-limitative Examples.

EXAMPLE 1

A silicon nitride powder having an average size of 5μ and containing 5% by weight of MgO and 2% by weight of Fe was formed into a compact having a density of 2g/cm$^3$ by cold isostatic pressing.

The compact was embedded in a protective powder with the following composition by weight: 50% Si$_3$N$_4$, 43% BN, 5% MgO and 2% Fe. The powder was prepared by mixing under wet conditions and subsequent drying. The packing was carried out by introducing a first layer of the powder into a graphite crucible, placing the compact on this layer and subsequently covering it completely with the powder, taking care that the powder be of homogeneous density and uniform distribution around the compact. The container, closed by a graphite lid, is subjected to degassing by vacuum treatment (10$^{-3}$ Torr) and flushing with nitrogen, to remove the gases trapped in the protective powder and at the interface between the latter and the compact. The pressure is brought to 750 Torr and the temperature is gradually brought to the sintering temperature, while passing pure nitrogen.

The sintering treatment is carried out at 1800° C. for two hours, the pressure of the nitrogen being adjusted to maintain it constantly at the initial value.

The compact thus sintered has a practically negligible (0.5%) loss in weight and does not have structural dishomogeneities as results from micro-probes and micrographic controls. The sintered compact has a density of 3.05 g/cm$^3$.

EXAMPLE 2

The run of Example 1 was repeated, using a compact (cylinder 10 cm in height and 5 cm in diameter) with the following composition by weight: 91% Si$_3$N$_4$, 8% Y$_2$O$_3$ and 1% MgO, and a density of 2.0 g/cm$^3$.

Use was made of a protective powder with the following composition by weight: 50% Si$_3$N$_4$, 45% BN and 5% MgO.

The sintering treatment was carried out at 1800° C. for five hours.

The sintered compact had substantially the same composition and the following properties.

| Density | 3.20 g/cm$^3$ |
|---|---|
| Total porosity | +2% |
| X-ray analysis | βSi$_3$N$_4$ amorphous phase traces of SiC |
| Bending strength at 25° C. | 60 Kg/mm$^2$ |
| 950° C. | 60 Kg/mm$^2$ |
| 1100° C. | 37 Kg/mm$^2$ |
| 1250° C. | 39 Kg/mm$^2$ |
| 1400° C. | 11 Kg/mm$^2$ |
| Weibull modulus (25° C.) | 9.3 |
| Young modulus, E, at 25° C. | 240,000 MN/m$^2$ |
| 1000° C. | 240,000 MN/m$^2$ |
| 1100° C. | 233,000 MN/m$^2$ |
| 1200° C. | 231,000 MN/m$^2$ |
| 1300° C. | 224,000 MN/m$^2$ |
| Thermal conductivity at 25° C. | 41.9 W/mk |
| 400° C. | 27.5 W/mk |
| Oxidation in statical air after | |
| 100 hours at 1000° C. | 0.1 mg/cm$^2$ |
| 1100° C. | 0.28 mg/cm$^2$ |
| 1200° C. | 0.70 mg/cm$^2$ |
| 1300° C. | 2.50 mg/cm$^2$ |
| 1350° C. | 8.20 mg/cm$^2$ |

EXAMPLE 3

The run of Example 2 was repeated, using the same protective powder and a reaction bonded silicon nitride compact of the same size with the same composition by weight (91% Si$_3$N$_4$, 8% Y$_2$O$_3$ and 1% MgO). The compact was prepared by isostatic pressing of the silicon powder up to a density of 1.6 g/m$^3$ and nitridation. The compact had a density of 2.55 g/cm$^3$.

The sintering treatment was carried out at 1800° C. for four hours.

The sintered compact had substantially the same composition and the following properties.

| density | 3.20 g/cm$^3$ |
|---|---|
| total porosity | 2% |
| X-ray analysis | βSi$_3$N$_4$ amorphous, traces of SiC and FeSi$_2$ |
| Bending strength at 25° C. | 100 Kg/mm$^2$ |
| Oxidation in statical air after | |
| 100 hours at 1300° C. | 0.90 mg/cm$^2$ |
| 1350° C. | 5.20 mg/cm$^2$ |

EXAMPLE 4

A mixture consisting of 90 wt.% silicon, with a maximum grain size of 44μ and average grain size of 5μ, 5 wt.% MgO and 5 wt.% Y$_2$O$_3$ is formed into cylinders (diameter=30 mm, h=45 mm, density=67% of the theoretical value) by means of cold isostatic pressing in rubber containers at a pressure of 2500 Kg/cm$^2$.

These samples are nitrided in a graphite resistance furnace in an atmosphere of flowing nitrogen (5 l/min.) for a period of 100 hours, the temperature being gradually brought from 1100° to 1390° C. with periods of stay at intermediate temperatures.

The material thus obtained has a density of 2.55–2.6 g/cm$^3$ (80% of the theoretical value) with Si$_3$N$_4$ predominantly in the α form (>80%).

The samples are submitted to a sintering treatment at 1800° C. for times variable from 1 to 3 hours in a graphite container, using a protective powder with the following composition by weight: 60% Si$_3$N$_4$, 30% BN, 5% MgO and 5% Fe. Once the sample is embedded in the powder, vacuum is applied (10$^{-3}$ Torr) while the temperature is brought to 1100° C., and nitrogen is then passed and the pressure brought to 500 Torr. The temperature is then gradually brought to 1800° C. while bringing the pressure to 750 Torr. The sintered sample is cooled in a nitrogen atmosphere.

The samples thus sintered have the following properties.

| density | 2.95–3.1 g/cm$^3$ |
|---|---|
| X-ray analysis | βSi$_3$N$_4$ traces of silicates and oxo-nitrogen compounds |
| porosity | <8% |
| bending strength (25° C.) | 55–65 Kg/mm$^2$ |

EXAMPLE 5

Samples of reaction bonded silicon nitride having the same density, structure and size as in Example 4 are prepared by the same procedure as in Example 4 from a silicon powder containing 5 wt.% of MgO and 2 wt.% of Fe.

Using the same procedure as in Example 4, the samples are sintered at 1700°–1800° C. for times of from 1 to 3 hours, using a protective powder with the following composition by weight: 50% $Si_3N_4$, 45% BN and 5% MgO. The sintered samples thus obtained have the following properties

| | |
|---|---|
| density | 2.85–2.95 g/cm$^3$ |
| X-ray analysis | $\beta Si_3N_4$ |
| | tracess of silicates |
| | and oxo-nitrogen |
| | compounds |
| porosity | <10% |
| bending strength (25° C.) | 45–55 Kg/mm$^2$ |

EXAMPLE 6

Samples of reaction bonded silicon nitride having the same density, structure and size as in Example 4 are prepared by the same procedure as in Example 4 from a silicon powder containing 5% by weight of $Y_2O_3$ and 2% by weight of Fe.

Using the same procedure as in Example 4, the samples are sintered at 1800° C. for 2 hours, using a protective powder with the following composition by weight: 50% $Si_3N_4$, 40% BN, 5% MgO and 5% $Y_2O_3$. The sintered samples have the following properties.

| | |
|---|---|
| density | 3.05 g/cm$^3$ |
| X-ray analysis | $\beta Si_3N_4$ |
| | traces of silicates |
| | and oxo-nitrogen |
| | compounds |
| porosity | <5% |
| bending strength (25° C.) | 60 Kg/mm$^2$ |

EXAMPLE 7

Samples of reaction bonded silicon nitride having the same density, structure and size as in Example 4 are prepared by the same procedure as in Example 4 from a silicon powder containing 8 wt.% of $CeO_2$ and 2 wt.% of Fe.

Using the same procedure as in Example 4, the samples are sintered at 1800° C. for 2 hours, using a protective powder with the following composition by weight: 50% $Si_3N_4$, 40% BN; 5% MgO and 5% $CeO_2$. The sintered samples have the following properties.

| | |
|---|---|
| density | 2.9 g/cm$^3$ |
| X-ray analysis | $\beta Si_3N_4$ |
| | traces of silicates |
| | and oxo-nitrogen |
| | compounds. |
| porosity | <5% |
| bending strength (25° C.) | 50 Kg/mm$^2$. |

EXAMPLE 8

Operating as in Example 4, a parallelepiped (5×5×20 mm) of reaction bonded silicon nitride predominantly in the $\alpha$ form and having a density of 2.37 g/cm$^3$ is sintered at 1800° C. for 1 hour, using a protective powder with the following composition by weight: 50% $Si_3N_4$, 45% BN and 5% MgO. The MgO has a surface area of about 35 m$^2$/g.

The sintered sample has the following properties

| | |
|---|---|
| density | 3.01 g/cm$^3$ |
| linear shrinkage | 6.9% |
| variation in weight | +0.1% |
| X-ray analysis | $\beta Si_3N_4$ |
| | traces of FeSi$_2$, Si |
| | and SiC |
| Mg content | 0.75% |

EXAMPLE 9

Operating as in Example 4, a parallelepiped (44×18×8 mm) of commercial reaction bonded silicon nitride having a density of 2.47 g/cm$^3$ is sintered at 1800° C. for 3 hours, using a protective powder with the following composition by weight: 50% $Si_3N_4$, 45% BN and 5% MgO with a surface area of about 35 m$^2$/g.

The sintered sample has the following properties

| | |
|---|---|
| density | 3.05 g/cm$^3$ |
| linear shrinkage | 6% |
| variation in weight | +0.9% |
| X-ray analysis | $\beta Si_3N_4$ |
| | traces of FeSi, |
| | Si and SiC |
| Mg content | 0.9% |

EXAMPLE 10

A sample of commercial silicon nitride powder is milled to an average size of about 1 micron, and formed into cylinders (diameter=28 mm, height=45 mm) having a green density of 1.9 g/cm$^3$ by isostatic pressing.

Operating as in Example 4, the samples are sintered at 1800° C. for 3 hours, using a protective powder with the following composition by weight: 50% $Si_3N_4$, 45% BN and 5% of MgO with a surface area of 38 m$^2$/g. The rise in temperature (300° C./h) was sufficient to permit diffusion of the additive in the samples.

The sintered material has the following properties.

| | |
|---|---|
| density | 3.02 g/cm$^3$ |
| linear shirikage | 14.8% |
| variation in weight | +0.8% |
| X-ray analysis | $\beta Si_3N_4$ |
| | traces of FeSi, SiC |
| | and Si |
| Mg content | 1.02% |

EXAMPLE 11

A sample of commercial silicon nitride is milled to an average size of about 1 micron and formed into cylinders (diameter 28 mm; height 45 mm) having a green density of 1.9 g/cm$^3$, by isostatic pressing.

Operating as in Example 4, the samples are sintered at 1800° C. for 3 hours, using a protective powder with the following composition by weight: 50% $Si_3N_4$, 45% BN and 5% $Mg_3N_2$ with a surface area of 1.4 m$^2$/g.

The sintered material has the following properties

| | |
|---|---|
| density | 2.82 g/cm$^3$ |
| linear shrinkage | 10.5% |
| loss in weight | 0.4% |
| X-ray analysis | $\beta Si_3N_4$ |
| | traces of FeSi$_2$, |
| | SiC and Si |

| | |
|---|---|
| -continued | |
| Mg content | 0.62% |

EXAMPLE 12

A parallelepiped (5×5×20 mm) of reaction bonded $Si_3N_4$ having a density of 2.54 g/cm$^3$ is sintered at 1800° C. for 1 hour, operating as in Example 4 and using a protective powder with the following composition by weight: 50% $Si_3N_4$, 45% BN and 5% $Mg_3N_2$ with a surface area of 1.4 m$^2$/g.

The sintered material has the following properties.

| | |
|---|---|
| density | 2.93 g/cm$^3$ |
| linear shrinkage | 2.8% |
| variation in weight | +0.23% |
| Mg content | 0.90% |

EXAMPLE 13

The run of Example 12 is repeated by using a sintering period of 5 hours. The sintered material has the following properties.

| | |
|---|---|
| density | 3.01 g/cm$^3$ |
| linear shrinkage | 6.5% |
| variation in weight | none |
| Mg content | 1% |

We claim:

1. A process for increasing the density of a reaction bonded silicon nitride article, which comprises the step of sintering the reaction bonded silicon nitride article of a density of at least 2.2 g/cm$^3$ in an atmosphere consisting essentially of nitrogen at substantially atmospheric pressure at a temperature of 1600° to 2000° C., while the article is embedded in a protective powder comprising silicon nitride, boron nitride, or a mixture of silicon nitride and boron nitride, and one or more sintering additives for silicon nitride, said sintering additives being present in the protective powder in an amount of from 3 to 20% by weight, wherein said sintering additives are selected from the group consisting of MgO, $Y_2O_3$, $Mg_3N_2$, $CeO_2$ and mixtures thereof with Fe.

2. The process of claim 1, wherein the reaction bonded silicon nitride article to be sintered also comprises one or more sintering additives uniformly dispersed therein in an amount not exceeding 20% by weight, said reaction bonded silicon nitride article to be sintered being formed by forming silicon powder into a compact containing said sintering additives and then nitriding the same to yield said reaction bonded silicon nitride article.

3. The process of claim 1, wherein the protective powder comprises MgO.

4. The process of claim 1, wherein the protective powder comprises from 5 to 15% by weight of sintering additives.

5. The process of claim 1, wherein said compact contains from 1 to 12% by weight of sintering additives.

6. The process of claim 5, wherein the compact contains MgO and $Y_2O_3$ sintering additives.

7. The process of claim 1, wherein the sintering is carried out at temperature from 1600° to 1900° C.

8. The process of claim 1, wherein the protective powder is degassed before the sintering treatment.

9. The process of claim 2, wherein said silicon powder has a density of at least 1.3 g/cm$^3$.

10. The process of claim 2, wherein said silicon powder compact is nitrided at 1350° to 1450° C.

11. The process of claim 10, wherein said nitriding of said silicon powder compact increases the density thereof without substantial dimensional change, thereby providing said reaction bonded silicon nitride compact of a density of at least 2.2 g/cm$^3$.

12. The process of claim 11, wherein the final density of the sintered silicon nitride article is close to the theoretical density of 3.18 g/cm$^3$.

13. The process of claim 12, wherein said silicon powder has a particle size of from 0.1 to 44μ.

14. The process of claim 13, wherein said reaction bonded silicon nitride article has a density on the order of 1.5–2.6 g/cm$^3$.

15. The process of claim 1, wherein said protective powder consists essentially of said silicon nitride, boron nitride, or a mixture of silicon nitride and boron nitride, and said one or more sintering additives.

16. The process for increasing the density of a reaction bonded silicon nitride article, which comprises the step of sintering the reaction bonded silicon nitride article of a density of at least 2.2 g/cm$^3$ in an atmosphere consisting essentially of nitrogen at substantially atmospheric pressure at a temperature of 1600° to 2000° C., while the compact is embedded in a protective powder consisting silicon nitride, boron nitride or a mixture of silicon nitride and boron nitride, and one or more sintering additives for silicon nitride, said sintering additives being present in the protective powder in an amount of from 3 to 20% by weight, wherein said reaction bonded silicon nitride compact to be sintered also comprises one or more sintering additives selected from the group consisting of MgO, $Y_2O_3$, $Mg_3N_2$, $CeO_2$ and mixtures thereof with Fe uniformly dispersed therein in an amount not exceeding 20% by weight, said reaction bonded silicon nitride compact to be sintered being formed by forming a silicon powder into a compact containing said sintering aids and then nitriding the same to yield said reaction bonded silicon nitride article.

17. The process of claim 1, wherein the reaction bonded silicon nitride article product is structurally and chemically homogeneous.

18. The process of claim 1, wherein the article is embedded in the protective powder by the steps which consist of placing the article on a layer of the protective powder and then embedding the article in the protective powder.

19. The process of claim 1, wherein the protective powder consists of silicon nitride and the one or more sintering additives.

20. The process of claim 1, wherein the protective powder consists of boron nitride and one or more sintering additives.

21. The process of claim 1, wherein the protective powder consists of silicon nitride, boron nitride and the one or more sintering additives.

22. A process for increasing the density of a reaction bonded silicon nitride article which comprises the steps of:

forming silicon powder into a compact and nitriding the same to yield the reaction bonded silicon nitride article;

sintering the reaction bonded silicon nitride article of a density of at least 2.2 g/cm$^3$ in an atmosphere consisting essentially of nitrogen at substantially atmospheric pressure at a temperature of 1600° to 2000° C., while the article is embedded in a protective powder comprising silicon nitride, boron nitride, or a mixture of silicon nitride and boron nitride, and one or more sintering additives for silicon nitride, said sintering additives being present in the protective powder in an amount of from 3 to 20% by weight, wherein said sintering additives are selected from the group consisting of MgO, $Y_2O_3$, $Mg_3N_2$, $CeO_2$ and mixtures thereof with Fe.

23. The process of claim 16, wherein the reaction bonded silicon nitride article product is structurally and chemically homogeneous.

24. The process of claim 16, wherein the article is embedded in the protective powder by the steps which consist of placing the article on a layer of the protective powder and then embedding the article in the protective powder.

25. The process of claim 16, wherein the protective powder consists of silicon nitride and the one or more sintering additives.

26. The process of claim 16, wherein the protective powder consists of boron nitride and the one or more sintering additives.

27. The process of claim 16, wherein the protective powder consists of silicon nitride, boron nitride and the one or more sintering additives.

28. The process of claim 22, wherein the reaction bonded silicon nitride article product is structurally and chemically homogeneous.

29. The process of claim 22, wherein the article is embedded in the protective powder by the steps which consist of placing the article on a layer of the protective powder and then embedding the article in the protective powder.

30. The process of claim 22, wherein the protective powder consists of silicon nitride and the one or more sintering additives.

31. The process of claim 22, wherein the protective powder consists of boron nitride and the one or more sintering additives.

32. The process of claim 22, wherein the protective powder consists of silicon nitirde, boron nitride and the one or more sintering additives.

* * * * *